(12) United States Patent
Miller et al.

(10) Patent No.: US 8,906,187 B2
(45) Date of Patent: Dec. 9, 2014

(54) METHOD OF MAKING SHOULDER/NOZZLES WITH FILM BARRIER LINERS

(75) Inventors: Christopher J. Miller, Flemington, NJ (US); David C. Hernandez, New Brunswick, NJ (US)

(73) Assignee: Colgate-Palmolive Company, New York, NY (US)

( * ) Notice: Subject to any disclaimer, the term of this patent is extended or adjusted under 35 U.S.C. 154(b) by 1144 days.

(21) Appl. No.: 12/146,127

(22) Filed: Jun. 25, 2008

(65) Prior Publication Data

US 2009/0324864 A1 Dec. 31, 2009

(51) Int. Cl.
*B29C 65/74* (2006.01)
*B29C 69/00* (2006.01)
*B32B 1/08* (2006.01)
*B29C 63/02* (2006.01)
*B32B 27/08* (2006.01)
*B65D 35/10* (2006.01)
*B29C 65/80* (2006.01)
*B29C 65/00* (2006.01)
*B29C 65/78* (2006.01)
*B29K 23/00* (2006.01)
*B29K 77/00* (2006.01)
*B29L 23/20* (2006.01)
*B29C 65/02* (2006.01)
*B29L 31/56* (2006.01)
*B29K 67/00* (2006.01)
*B29K 25/00* (2006.01)
*B29L 9/00* (2006.01)

(52) U.S. Cl.
CPC .............. *B29C 69/005* (2013.01); *B29C 65/80* (2013.01); *B29C 66/929* (2013.01); *B32B 1/08* (2013.01); *B29K 2995/0035* (2013.01); *B29C 66/612* (2013.01); *B29C 65/7802* (2013.01); *B29K 2023/12* (2013.01); *B29C 66/949* (2013.01); *B29K 2995/0018* (2013.01); *B29K 2077/00* (2013.01); *B29L 2023/20* (2013.01); *B29C 63/02* (2013.01); *B29C 66/919* (2013.01); *B29C 65/02* (2013.01); *B29L 2031/565* (2013.01); *B29K 2995/0069* (2013.01); *B32B 27/08* (2013.01); *B29K 2067/046* (2013.01); *B29C 66/63* (2013.01); *B29C 66/8432* (2013.01); *B29K 2067/043* (2013.01); *B29K 2023/06* (2013.01); *B29K 2025/00* (2013.01); *B29C 66/53245* (2013.01); *B29C 2793/0018* (2013.01); *B29L 2009/003* (2013.01)

USPC .......... 156/251; 156/211; 156/212; 156/242; 156/293; 156/303.1; 156/513; 156/515; 264/259; 264/268

(58) Field of Classification Search
USPC ............ 156/261, 262, 211, 251, 244.18, 293, 156/294, 303.1, 515, 212, 513, 514; 222/107; 264/268, 269
See application file for complete search history.

(56) References Cited

U.S. PATENT DOCUMENTS 1,322,426 A 11/1919 Gearhart
1,590,853 A 6/1926 Rohland
(Continued)

FOREIGN PATENT DOCUMENTS

CN 1103355 A 6/1995
CN 1564772 A 1/2005
(Continued)

OTHER PUBLICATIONS

Machine translation of Japanese Patent Publication No. JP-06179462A, 10 pages.*

(Continued)

*Primary Examiner* — William Bell
(74) *Attorney, Agent, or Firm* — Judy W. Chung

(57) ABSTRACT

The method comprises an automated technique for making and inserting flexible laminate film barrier liners into the shoulder/nozzles of product tube packaging. The shoulder/nozzles are made and oriented with the shoulder opening to be facing the laminate film. The film is fed to a station that forms the nozzle aperture, die cuts the laminate film to fit into the shoulder of the shoulder/nozzle, and inserts this laminate film into the shoulder/nozzle. The laminate film can be heat bonded to the shoulder nozzle at this station or in a subsequent sealing station. After the shoulder/nozzle leaves the station that forms and inserts the laminate film into the shoulder/nozzle there can be a detection station to determine if the laminate film is properly aligned in the shoulder/nozzle. There also can be a detection station after a subsequent sealing station. Shoulder/nozzles with sealed laminate film liner are then sent to tube making. The laminate film will have a polymer layer and a barrier layer comprising ethylene vinyl alcohol copolymers, polyethylene terephthalate polymers, polyethylene naphthalate polymers and acrylonitrile methylacrylate copolymers The tube packages produced using these shoulder/nozzles are very useful for products which contain flavorants, such as dentifrices.

17 Claims, 4 Drawing Sheets

(56) References Cited

U.S. PATENT DOCUMENTS

| | | | |
|---|---|---|---|
| 2,119,926 A | 6/1938 | Quittner | |
| 3,178,065 A | 4/1965 | Auerswald | |
| 3,260,411 A | 7/1966 | Dobson | |
| 3,295,725 A | 1/1967 | Brandt | |
| 3,426,102 A | 2/1969 | Solak et al. | |
| 3,465,917 A | 9/1969 | Saeki | |
| 3,565,293 A | 2/1971 | Schultz | |
| 3,700,513 A * | 10/1972 | Haberhauer et al. | 156/69 |
| 3,764,425 A * | 10/1973 | Neff et al. | 156/69 |
| 3,958,421 A | 5/1976 | Kelly | |
| 3,958,721 A | 5/1976 | Kushida et al. | |
| 3,962,006 A * | 6/1976 | Saito et al. | 156/69 |
| 4,011,968 A | 3/1977 | McGhie et al. | |
| 4,060,179 A | 11/1977 | McGhie | |
| 4,096,946 A | 6/1978 | Cook et al. | |
| 4,132,331 A | 1/1979 | Magerle | |
| 4,133,331 A | 1/1979 | Otsubo et al. | |
| 4,142,630 A | 3/1979 | Hayes et al. | |
| 4,185,757 A | 1/1980 | Schultz | |
| 4,254,169 A | 3/1981 | Schroeder | |
| 4,257,536 A | 3/1981 | Hilmar | |
| 4,262,818 A | 4/1981 | Stanley | |
| 4,262,819 A | 4/1981 | Hayes | |
| 4,338,278 A | 7/1982 | Schultz | |
| 4,448,829 A | 5/1984 | Kohler | |
| 4,483,891 A | 11/1984 | Cerny | |
| 4,492,548 A | 1/1985 | Hubert | |
| 4,493,439 A | 1/1985 | Ledewitz | |
| 4,514,159 A | 4/1985 | Magerle | |
| 4,526,297 A | 7/1985 | Grimsley | |
| 4,528,219 A | 7/1985 | Yamada et al. | |
| 4,548,338 A | 10/1985 | Sander | |
| 4,568,001 A | 2/1986 | Sander | |
| 4,595,612 A | 6/1986 | Tavss et al. | |
| 4,623,117 A | 11/1986 | Ueberegger | |
| 4,625,498 A * | 12/1986 | Parsons | 53/526 |
| 4,664,284 A | 5/1987 | Magerle | |
| 4,693,395 A | 9/1987 | Tavss et al. | |
| 4,784,708 A * | 11/1988 | Allen | 156/67 |
| 4,792,061 A | 12/1988 | Nisida | |
| 4,834,822 A | 5/1989 | Ueberegger | |
| 4,927,058 A | 5/1990 | Nimmey et al. | |
| 4,931,006 A | 6/1990 | Schwyn et al. | |
| 4,942,981 A | 7/1990 | Schneider | |
| 4,985,191 A | 1/1991 | Hannon, Jr. | |
| 5,024,354 A | 6/1991 | Ledewitz | |
| 5,035,349 A | 7/1991 | Donahue | |
| 5,041,180 A | 8/1991 | Makilaakso | |
| 5,069,856 A | 12/1991 | Holoubek et al. | |
| 5,203,379 A | 4/1993 | Holoubek et al. | |
| 5,257,536 A | 11/1993 | Beigbeder et al. | |
| 5,292,034 A | 3/1994 | Keller | |
| 5,372,863 A | 12/1994 | Nishikawa | |
| 5,386,918 A | 2/1995 | Neveras et al. | |
| 5,407,742 A | 4/1995 | Tavss et al. | |
| 5,505,813 A | 4/1996 | Scheifele et al. | |
| 5,556,678 A | 9/1996 | Jupin et al. | |
| 5,569,144 A | 10/1996 | Schwyn | |
| 5,571,372 A * | 11/1996 | Miyaishi et al. | 156/515 |
| 5,618,365 A | 4/1997 | Rebeyrolle et al. | |
| 5,656,346 A | 8/1997 | Hirt | |
| 5,690,764 A | 11/1997 | Dirksing et al. | |
| 5,804,270 A | 9/1998 | Kawamura et al. | |
| 5,858,543 A | 1/1999 | Futter et al. | |
| 5,913,434 A | 6/1999 | Fukuhara et al. | |
| 5,913,449 A | 6/1999 | Branch et al. | |
| 5,962,096 A | 10/1999 | Smith et al. | |
| 6,042,906 A | 3/2000 | Itoh et al. | |
| 6,170,705 B1 | 1/2001 | Schneider et al. | |
| 6,331,331 B1 | 12/2001 | Millonn et al. | |
| 6,383,589 B1 | 5/2002 | Horan et al. | |
| 6,656,346 B2 | 12/2003 | Ino et al. | |
| 6,698,618 B2 | 3/2004 | Ramsey | |
| 6,722,531 B2 | 4/2004 | Matsuo et al. | |
| 6,766,921 B2 | 7/2004 | Keller | |
| 6,877,638 B2 | 4/2005 | Chan et al. | |
| 7,037,456 B2 | 5/2006 | Gruau et al. | |
| 7,264,880 B2 | 9/2007 | Wei et al. | |
| 2005/0029216 A1 | 2/2005 | Scheifele | |
| 2005/0161470 A1 | 7/2005 | Johns et al. | |
| 2006/0032866 A1 | 2/2006 | Labbe et al. | |
| 2006/0151526 A1 | 7/2006 | Narayanan | |
| 2006/0157502 A1 | 7/2006 | Meausoone et al. | |
| 2006/0188676 A1 | 8/2006 | Dambricourt | |
| 2006/0204693 A1 | 9/2006 | Dambricourt | |
| 2006/0286324 A1 | 12/2006 | Helmenstein | |
| 2007/0026174 A1 | 2/2007 | Labbe et al. | |
| 2007/0036927 A1 | 2/2007 | Funaki et al. | |
| 2007/0082160 A1 | 4/2007 | Dambricourt | |
| 2007/0084557 A1 | 4/2007 | Langseder et al. | |

FOREIGN PATENT DOCUMENTS

| | | | |
|---|---|---|---|
| CN | 1313327 C | | 5/2007 |
| EP | 130239 A1 * | | 1/1985 |
| EP | 0 382 103 A1 | | 8/1990 |
| GB | D2087381 | | 10/1999 |
| JP | 47048583 A * | | 12/1972 |
| JP | 55-038262 A | | 3/1980 |
| JP | 55-107650 A | | 8/1980 |
| JP | 61192543 A * | | 8/1986 |
| JP | 05200874 A * | | 8/1993 |
| JP | 6-64653 A | | 3/1994 |
| JP | 06179462 A * | | 6/1994 |
| RU | 2097019 | | 11/1997 |
| WO | WO 02/44040 | | 6/2002 |
| WO | WO 03/013965 | | 2/2003 |

OTHER PUBLICATIONS

Webster's New Collegiate Dictionary, G. & C. Merriam Co., 1977, p. 281.*

International Search Report PCT/US2008/068297 Mailed Mar. 17, 2009.

Van Gordon et al., 1976, "Bioconversion of Barex 210 (An Acrylonitrile Copolymer) Nitrogen for Plant Utilization," J. Agric. Food Chem. 24(4):823-824.

* cited by examiner

METHOD OF MAKING SHOULDER/NOZZLES WITH FILM BARRIER LINERS

FIELD OF THE INVENTION

This invention relates to film barrier liners for the shoulder/nozzles of tube packaging. In addition this invention relates to continuous methods for making tube shoulder/nozzles with film laminate liners to preclude the absorption of product components from a packaged substance in contact with the shoulder/nozzle.

BACKGROUND OF THE INVENTION

This invention is directed to tube packaging and a method of making that tube packaging so as to minimize the absorption of components of the product in the tube by the tube components. A tube package consists of the tube body, the tube shoulder/nozzle and a closure. The absorption of product components by the tube body can be minimized by the use of a tube laminate structure that includes a barrier such as a metal foil or a plastic film such as ethylene vinyl alcohol, polythylene terephthalate, polyethylene naphthalate, or acrylonitrile methyl-acrylate copolymers. The shoulder/nozzle consists of a large amount of a polymer or copolymer that has a plurality of alkene groups. Therefore, a barrier is required between the shoulder/nozzle and the product in the tube.

The barrier requirement has been recognized in the prior art for more than 30 years. U.S. Pat. No. 4,011,968 discloses the friction fit of a barrier insert into the shoulder nozzle of a tube. U.S. Pat. Nos. 3,565,293 and 4,185,757 disclose the forming of a shoulder/nozzle on and around a barrier insert. In this way the shoulder/nozzle and the barrier insert are essentially a single piece. It is further disclosed in U.S. Pat. No. 4,185,757 that at the time that the shoulder/nozzle is being formed on and around the barrier nozzle that the shoulder/nozzle can be attached to the tube body. This has many structural and manufacturing advantages. U.S. Pat. No. 5,656,346 discloses performing an insert with the insert having a polyethylene layer and a polyethylene terephthalate layer or ethylene vinyl alcohol layer. The polyethylene layer will be adjacent to the shoulder/nozzle material and will bond to the shoulder/nozzle material and the polyethylene terephthalate layer or ethylene vinyl alcohol layer will be in contact with the product to function as a barrier between the product and the shoulder/nozzle. U.S Patent Application 2005/0029216 is directed to a preformed insert that has a particular geometry. However, that geometry appears to be disclosed in the aforementioned patents.

BRIEF SUMMARY OF THE INVENTION

The present invention is directed to using flexible film laminates as the barrier in shoulder/nozzles and to a method of producing the laminate film liners and the inserting and sealing of these laminate film liners in the shoulder/nozzles. These laminate film liners are film laminates that are not preformed to the shape of the shoulder/nozzle. They conform to the shape of the shoulder/nozzle upon being inserted into the shoulder/nozzle and sealed to the shoulder/nozzle. The shape of the shoulder/nozzle can vary within certain bounds and the same laminate film liner can be used. If the shape of the shoulder nozzle is outside of the certain bounds, then all which will be needed is a different die cutter to form the nozzle opening and to cut the film laminate to the required diameter. This is an easy equipment change that can be made in minutes. There also is the advantage that less manufacturing equipment is needed when using film laminate of the present invention as opposed to preformed barrier inserts. More specifically, injection molding equipment to make preformed inserts, hoppers and sorting equipment to hold the preformed inserts, equipment to align the preformed inserts for input into a formed shoulder/nozzle, or into equipment to form the shoulder/nozzle on the preformed insert, are not required when using the laminate film liner as in the present invention. In the present invention there is only the need to store rolls of film laminate material. The net result is a savings on the capital cost of equipment and a savings in manufacturing operations. There is set out an effective way to use film laminate material as the barrier in shoulder/nozzles of tubes.

The methods for making tube shoulder/nozzles with a barrier for the tube shoulder/nozzles comprises forming the tube shoulder/nozzle, placing the tube shoulder/nozzle in a holder with the shoulder end exposed, placing a film laminate comprising a barrier layer and a polymer layer above the shoulder end, the polymer layer facing into the shoulder/nozzle, contacting the film laminate with a die/mandrel to (i) cut the film laminate to fit into the shoulder/nozzle, and (ii) insert the film laminate into the shoulder/nozzle. The cutting of the film laminate to fit into the shoulder/nozzle comprises two operations, one is to form a nozzle opening in the film laminate and the other is to cut the film laminate to a diameter that can fit the shoulder of the shoulder/nozzle. The cut film laminate in the area of the nozzle is comprised of one of a circular aperture, a plurality of slits and a circular aperture, and a plurality of slits.

The method can comprise a plurality of stations, the die cutting of the film laminate to fit into the shoulder/nozzle being at one station and the sealing of the film laminate into the shoulder/nozzle being at another station. The die cutting of the film laminate to fit into the shoulder/nozzle comprises two operations, one is to form a nozzle opening in the film laminate and the other is to cut the film laminate to fit into the shoulder of the shoulder/nozzle. The nozzle opening of the film laminate is comprised of one of an aperture, usually a circular aperture, a plurality of slits or an aperture with a plurality of peripheral slits. The shoulder/nozzles after the film laminate is inserted into the shoulder/nozzle, and prior to sealing the film laminate in the shoulder/nozzle, are fed to a detector to determine the positioning of the film laminate in the shoulder/nozzle. If not properly positioned, it will be rejected. The film laminate is sealed to the shoulder/nozzle by heat bonding the polymer layer of the film laminate to the inner surface of the shoulder/nozzle. After the film laminate is sealed into the shoulder/nozzle, the shoulder/nozzle is fed to a detector to determine the positioning of the film laminate sealed into the shoulder/nozzle. If the film laminate is not properly positioned, the shoulder/nozzle is rejected. After the film laminate is sealed into the shoulder/nozzle, the shoulder/nozzle is fed to be attached to a tube body. The tube body with the shoulder/nozzle attached will have a closure attached, the tube filled with a product and the lower end crimped sealed to close the tube body. This tube structure is particularly useful for dentifrice products. Such products are usually sold in tubes.

In an alternate embodiment, the film laminate can be bonded to the shoulder/nozzle at the time that the film laminate is being die cut to form the nozzle aperture and to fit into the shoulder. In such an embodiment the die/mandrel is at a temperature to seal the die cut film laminate into the shoulder/nozzle after inserting the die cut film laminate into the shoulder/nozzle. The shoulder/nozzle, after the film laminate is sealed into the shoulder/nozzle, is fed to a detector to determine the positioning of the film laminate sealed into the shoulder/nozzle. If not properly positioned, it will be rejected. The shoulder/nozzles then are fed to be attached to a tube body.

The film laminate has a thickness of about 100 micron to about 400 micron, the barrier layer having a thickness of about 15 micron to about 100 micron and the polymer layer having a thickness of about 75 micron to about 250 micron. A tie layer bonding the barrier layer to the polymer layer will have a thickness of about 10 micron to about 50 micron. The barrier layer of the barrier/polymer laminate film can be any polymeric material that is essentially inert to the substances that are to be packaged in the tube. Useful barrier layers can be selected from polyethylene terephthalate, polytrimethylnaphthalate, polyethylene naphthalate, ethylene vinylalcohol copolymers, acrylonitrile-methyl acrylate copolymers, amorphous polyamides, polylactic acid, polyglycolic acid polymers and polyhydroxy alkanote polymers. The polymer of the barrier/polymer film laminate can be any polymer that can be bonded to the shoulder plastic. Usually it will be essentially the same as the nozzle/shoulder 10 plastic. Preferably the polymer will contain a fluorescent material. After the film laminate has been inserted into shoulder of the shoulder/nozzle the film laminate is contacted with a light source to activate the fluorescence to ascertain the position of the film laminate in the shoulder.

DETAILED DESCRIPTION OF THIS INVENTION

The invention will be described in more detail in its preferred embodiments with reference to the attached drawings. Modifications can be made to the embodiments described herein, but such modifications will be within the present inventive concept.

Figure 1:
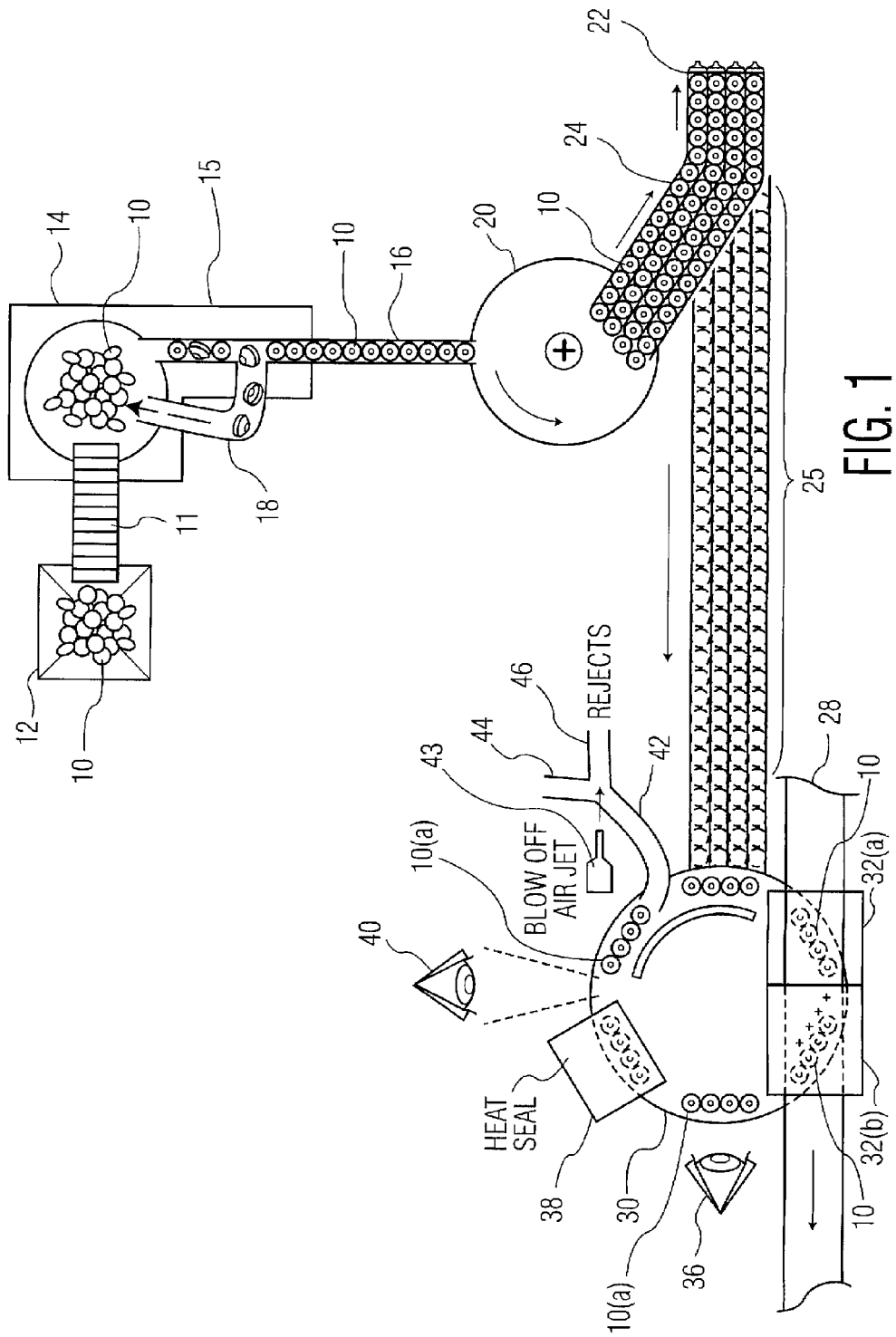
FIG. 1 is a plan view of the design layout for the equipment to make the film laminate liners and to put the laminate film liners into shoulder/nozzles.
Figure 2:
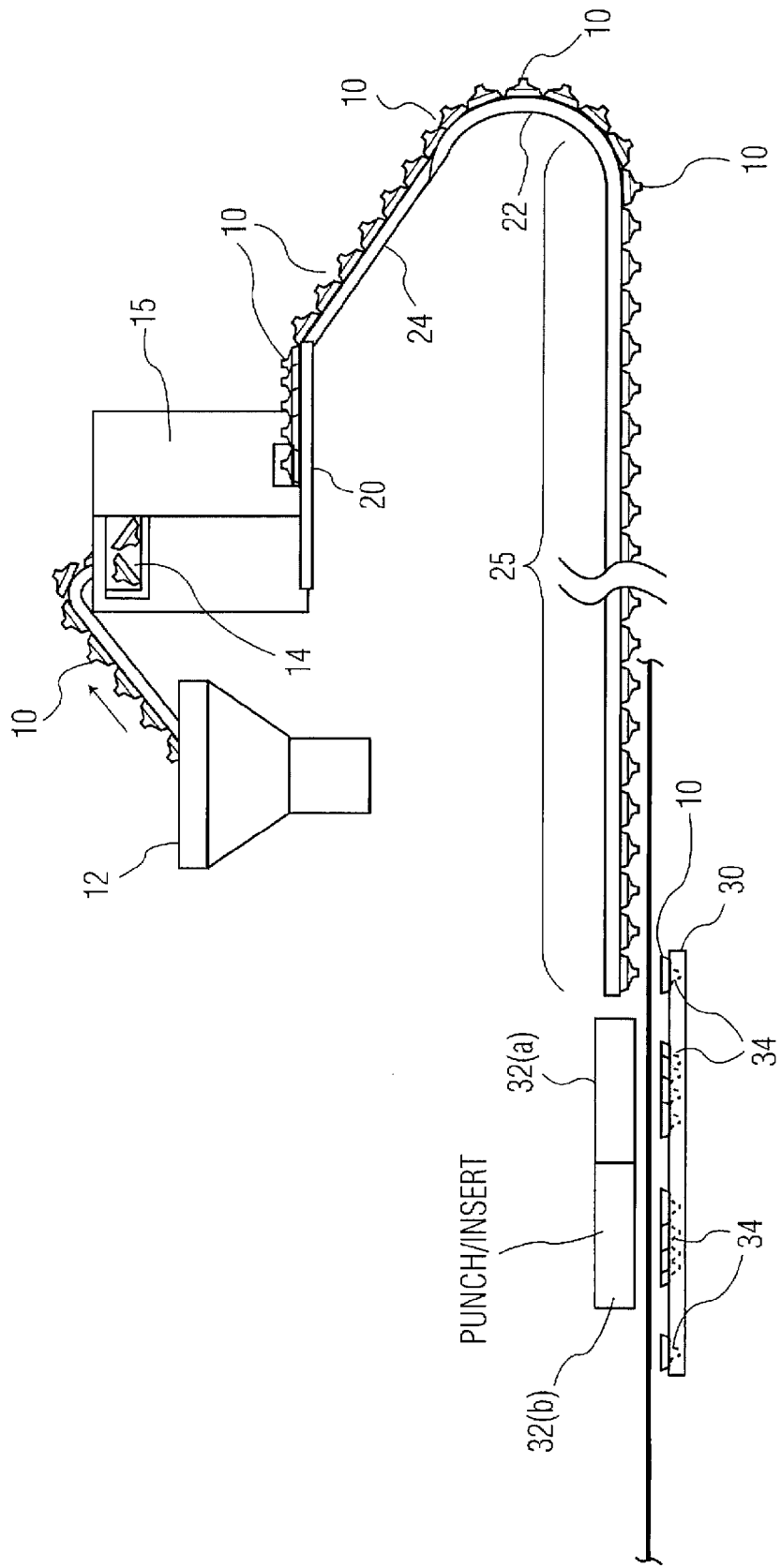
FIG. 2 is a side elevation view of the design layout of FIG. 1.
Figure 3:
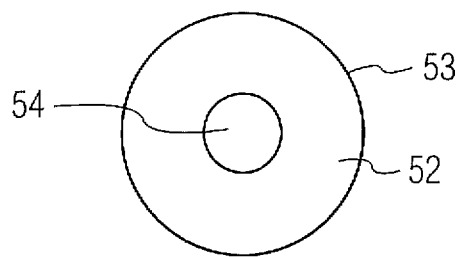
FIG. 3 is a top plan view of a laminate film liner prior to being inserted into a shoulder/nozzle.
Figure 4:
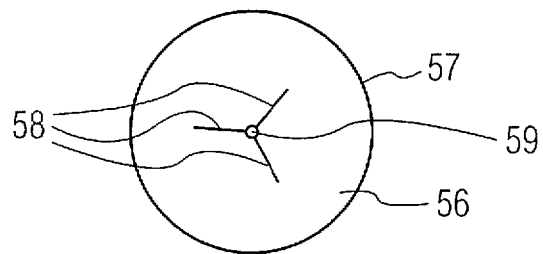
FIG. 4 is a top plan view of an alternate laminate film liner prior to being inserted into a shoulder/nozzle.
Figure 5:
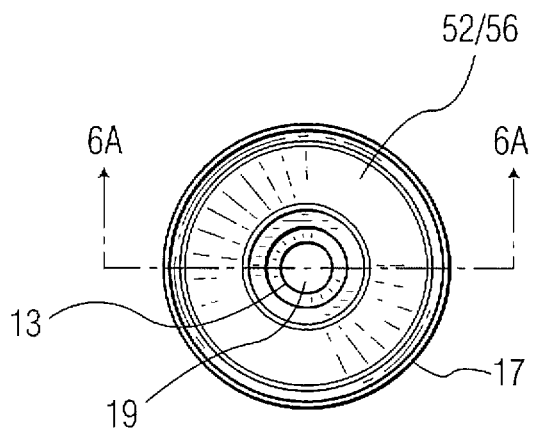
FIG. 5 is a bottom plan view of a shoulder/nozzle with a film laminate of FIG. 3 sealed in the shoulder/nozzle.
Figure 6A:
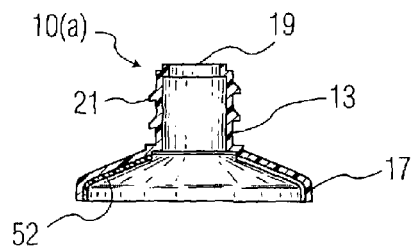
FIG. 6A is a side elevation view of the shoulder/nozzle with the laminate film of FIG. 3.

Referring to FIGS. 1 and 2 concurrently, FIG. 1 is a top plan view of the layout design for the equipment to make the shoulder/nozzles 10(a) of the present invention and FIG. 2 is a side elevation view of the equipment. The equipment and the manufacturing method comprise a hopper 12 which holds a plurality of molded shoulder/nozzles 10 for tube packages. The shoulder/nozzles 10 are conveyed from the hopper 12 by a conveyor 11 to a sorting and aligning table 14 which is a part of a shoulder/nozzle unit 15. The sorting and aligning table 14, through vibration and other means, causes the shoulder/nozzles 10 to align in an upright orientation, that is with the nozzle end 13 oriented upwards, as seen in FIG. 6A. The oriented shoulder/nozzles 10 flow through a chute 16 to a rotating table 20. The shoulder/nozzles 10 exit the rotating table 20 through a row of channels 24. Shown in this view are four channels 24. The invention is not limited to any particular number of channels 24, however, and the number of channels 24 can be less or more than four channels. Six or eight channels 24 would increase the capacity of the equipment. The shoulder/nozzles 10 move into the channels 24 by a gravity feed and a push from the trailing shoulder/nozzles 10. The shoulder/nozzles 10 are maintained in the channels 24 by means of a rolled over edge on the side of each channel 24. The rolled over edge functions as a rail to hold each of the shoulder/nozzles 10 in the channels 24. The channels 24 bend at an obtuse angle to a modified alignment. At an inverted U-turn 22, the channels 24 undergo a 180 degree change in direction and a new orientation. The shoulder/nozzles 10 become inverted so that the nozzle end 13 is now oriented downward. The shoulder/nozzles 10 are maintained in the channels 24 through and after the inverted U-turn by the rolled over edges of the channels 24 which function as holding rails. In section 25 the shoulder/nozzles 10 flow in an inverted orientation. The shoulder/nozzles 10 exit the channels 24 at a rotating forming unit 30 which rotates clockwise. The rotating forming unit 30 has an intermittent motion so that work can be done on the shoulder/nozzles 10 at a plurality of stations. The inverted shoulder/nozzles 10 are held in slot holders 34 (see FIG. 2). The rotating forming unit 30 moves a set of the shoulder/nozzles 10 to die punch station 32(a) where the nozzle opening as shown in FIG. 3 or FIG. 4 may be formed. The nozzle opening may also be preformed on the shoulder/nozzles 10 before they are loaded into the hopper 12. In such a case, the rotating forming unit 30 will not create the nozzle opening. Additionally, the set of shoulder/nozzles 10 illustrated includes four shoulder/nozzles 10, however, more or less shoulder/nozzles 10 may be included in a set.

A roll (not illustrated) of film laminate 28 is positioned near the rotating forming unit 30. The film laminate 28 moves tangentially to the rotating forming unit 30. The film laminate 28 moves above the shoulder/nozzle 10 so that a section of the film laminate 28 can be inserted into each of the shoulder/nozzles 10. At the die punch station 32(a), an aperture is formed on the film 28. As seen in FIGS. 3 and 4, the aperture 54, 59 formed in the die cutting station 32(a) can vary in size and shape. After the aperture 54, 59 is formed, the shoulder/nozzles 10 and film laminate 28 with apertures 54, 59 move to die punch/insertion station 32(b). In the die punch/insertion station 32(b), an outer perimeter of the film laminate 28 around each nozzle aperture is formed by a cutting operation on the film. The film laminate 28 has now been severed so that the severed portion can fit the shoulder of the shoulder/nozzle 10. The film liner 52 or 56 (shown in FIGS. 3 and 4), i.e. film laminate 28 having one of the nozzle aperture 54, 59 and cut to fit the shoulder, is inserted into shoulder/nozzle 10. A set of shoulder/nozzles 10(a), now with the film liner 52/56 inserted therein passes through a first quality detection station 36. At the first quality detection station 36, it is determined if the film liner 52/56 has been properly inserted into the shoulder/nozzle 10(a). The film laminate 28 will in a preferred embodiment contain a fluorescent material. The function of the fluorescent material is to determine the positioning of the formed film in the shoulder nozzles. A wavelength of light is focused on the film liner 52/56 when it is positioned in the shoulder/nozzle 10(a). A sensor in the quality detection station 36 picks up the position of the fluorescence. If the film liner 52/56 has been properly positioned, then the shoulder/nozzles 10(a) proceed to a heat seal station 38. Otherwise, they are rejected.

At the heat seal station 38, the film liner 52/56 is heated via a heated mandrel (not shown) which enters the inverted shoulder/nozzles 10(*a*) and bonds the inserted film liner 52/56 to the interior surface of the shoulder/nozzle 10(*a*). The operating temperature of the heated mandrel is dependent upon the materials of the film liner 52/56 and the shoulder/nozzle 10. The heated mandrel preferably applies heat at a temperature between 149° C. and 260° C. for a time frame between 0.4 seconds and 1.5 seconds and more preferably between 215° C. and 248° C. for a time frame of between 0.7 seconds and 0.9 seconds. The pressure applied by the heated mandrel to the shoulder/nozzle 10(*a*) is preferably between 2 bar and 6 bar, and more preferably between 4.5 bar and 5 bar. The invention is not limited to a particular applied temperature range, time and pressure, however, unless specifically claimed. After the film liner 52/56 is bonded to the shoulder/nozzle 10(*a*), the shoulder/nozzles 10(*a*) then pass through a second quality detection station 40. Again, the fluorescence of the film liner 52/56 is detected to determine if the film liner 52/56 has been properly inserted into the shoulder/nozzle 10(*a*). The shoulder/nozzles 10(*a*) then enter the chute 42. The shoulder/nozzles 10(*a*) that meet the quality standards determined at the quality detection station 40 pass to the channel 44. The shoulder/nozzles 10(*a*) that do not meet the quality standards are ejected through the chute 46 by a burst of air from blow off from an air jet 43. The shoulders/nozzles 10(*a*) that exit the channel 44 proceed to tube making where they are used to make a tube such as the tube 60 shown in FIG. 7.

Referring now to FIGS. 3 and 4, film liners 52, 56 are illustrated. The film liners 52/56 were formed from the barrier film 28 as discussed with reference to FIGS. 1 and 2. The film liner 52 comprises an aperture 54 and a perimeter 53. The aperture 54 is preferably a circular shaped opening having a diameter generally equal to the diameter of the nozzle opening of the shoulder/nozzle 10. The perimeter 53 of the film liner 52 is a circular shaped opening. The film liner 56 comprises a center aperture 59, three slits 58 and the perimeter 57. The center aperture 59 is a circular shaped opening that is smaller than the nozzle opening of the shoulder/nozzle 10. The three slits 58 extend from the aperture 59 in a radial direction. Although not illustrated, film liner may be cut so as to have only slits and a perimeter without a circular aperture.

Figure 6B:
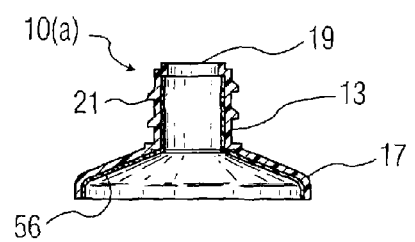
FIG. 6B is a side elevation view of the shoulder/nozzle with the laminate film of FIG. 4.

FIGS. 6A and 6B show shoulder/nozzle 10(*a*) comprising one of the film liners 52, 56. The shoulder/nozzle 10(*a*) comprises the nozzle 13 and the shoulder 17. The nozzle has aperture 19 and threads 21 for the attachment of a closure. In FIG. 6A the film liner 52 is solely in the shoulder 17 while in FIG. 6B the film liner 56 is in both the shoulder 17 and the nozzle 13.

Figure 7:
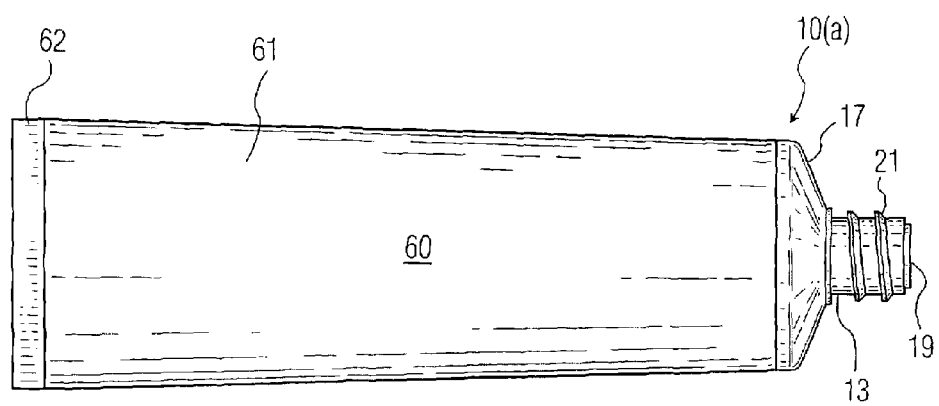
FIG. 7 is a side elevation view of a tube with the shoulder/nozzle with the laminate films of this invention.

FIG. 7 shows a tube 60 with a tube body 61 and a tube closing crimp 62. On the other end is the shoulder/nozzle 10(*a*) with nozzle 13, shoulder 17, aperture 19 and threads 21. This tube can have the shoulder/nozzle of FIG. 6A or 6B.

The shoulder/nozzle 10 usually is comprised of a polymer such as a polyethylene or a polypropylene, co-polymers of ethylene or propylene, including ethylene-propylene copolymers, and vinyl polymers and copolymers. The tube body 60 can be comprised of any of the known tube structures disclosed and/or used in the prior art. Usually these tube body structures will be a laminate and have a barrier layer of a metal foil, a polyester, polyamide, or an ethylene vinyl alcohol copolymer. The film liners 52/56 formed from the laminate film 28, will have a laminate structure of two or more layers with a polymer layer on one side so as to bond to inner surface of the shoulder/nozzle 10 and a barrier layer on the other side that contacts the product in the tube 60. A tie layer that bonds the barrier layer to the polymer layer may also be included.

The laminate film 28 will in a preferred embodiment also contain a fluorescent material. The fluorescent material will preferably be in the polymer layer since it will then not be in contact with the product in the tube. The function of the fluorescent material is to determine the positioning of the laminate film in the shoulder/nozzles. The fluorescent material will be blended into the polymer material of the film laminate when this polymer is being manufactured. It must be compatible with and blendable into the polymer. The film laminate 28 has a thickness of about 100 micron to about 400 micron, the barrier layer having a thickness of about 15 micron to about 100 micron and the polymer layer having a thickness of about 75 micron to about 250 micron. The tie layer bonding the barrier layer to the polymer layer will have a thickness of about 10 micron to about 50 micron.

The polymer layer of the film laminate 28 can be a polyethylene, a polypropylene, co-polymers of ethylene or propylene, including ethylene-propylene copolymers, and vinyl polymers and copolymers. The polymer layer of the film laminate 28 will be one that can be heat bonded to the polymer of the shoulder. Usually these will be the same since like polymers will readily bond to like polymers. The fluorescent material will be blended into the polymer material of the film laminate 28 when this polymer is being manufactured. It must be compatible with and blendable into the polymer. Useful fluorescent materials include the benzoxanthene, benzothiazine, perylene imide, thioxanthene, thioindigoid, naphthalimide and coumarin fluorescent dyes. Various fluorescent dyes that can be used in the polymer layer of the film laminate are available from the DayGlo Color Corporation of Cleveland, Ohio. The barrier layer of the film laminate 28 will be a material that is essentially inert to the components of the product that is to be contained in the tube. The barrier layer can be a polyester such as polyethylene terephthalate, polyethylene naphthalate, polytrimethyl naphthalate, ethylene vinyl alcohol copolymers, polylactic acid, polyglycolic acid, polyamides such as amorphous polyamides (aliphatic and aromatic), a metal foil, or an acrylonitrile methyl-acrylate copolymer. The barrier layer may also be an in-organic coating such as SiOx (x from 1 to 2) and aluminum oxide, an organic coating such as epoxy amine based, amorphous carbon based and polyvinyl alcohol based, and polymer nanocomposites. The tie layer of the film laminate 28 will be a polymer that will adhere to the polymer layer and to the barrier layer. Various polymers are useful as the tie layer. These include ethylene/vinylacetate copolymers, ethylene methyl acrylate copolymers, ethylene butyl acrylate copolymers, ethylene/acrylic ester/maleic anhydride terpolymers, and ethylene/vinyl acetate/maleic anhydride terpolymers. These are commercially available tie layers. The products that are packaged in the tubes with this structure are those where the absorption of organic components of the products will deleteriously affect the product. This includes dentifrices, and other oral care products, personal care products, and food products.

We claim:

1. A method of making a tube shoulder/nozzle with a barrier in the tube shoulder/nozzle comprising:

forming the tube shoulder/nozzle having a shoulder portion and a nozzle portion, the shoulder portion comprising a first end of the tube shoulder/nozzle and a first portion of an inner surface of the tube shoulder/nozzle and the nozzle portion comprising a second end of the tube shoulder/nozzle and a second portion of the inner surface of the tube shoulder/nozzle;

placing the tube shoulder/nozzle in a holder with the first end of the tube shoulder/nozzle exposed;

placing a film laminate comprising a barrier layer and a polymer layer above the first end of the tube shoulder/nozzle, the polymer layer forming a first side of the film laminate and the barrier layer forming a second opposite side of the film laminate, the polymer layer facing the tube shoulder/nozzle;

contacting the film laminate with a die/mandrel to simultaneously (i) cut the film laminate to fit into the tube shoulder/nozzle, and (ii) insert the film laminate into the tube shoulder/nozzle, the film laminate conforming to the shape of the tube shoulder/nozzle upon being inserted into the tube shoulder/nozzle; and wherein the die/mandrel is at a temperature to also seal the film laminate into the tube shoulder/nozzle upon cutting the film laminate to fit into the tube shoulder/nozzle, the polymer layer bonding to at least a portion of each of the first and second portions of the inner surface of the tube shoulder/nozzle and the barrier layer contacting a product in a tube comprising the tube shoulder/nozzle.

2. A method as in claim 1 wherein the film laminate is sealed to the portion of each of the first and second portions of the inner surface of the tube shoulder/nozzle after the film laminate is inserted into the tube shoulder/nozzle.

3. A method as in claim 2 wherein the film laminate has a nozzle opening which is comprised of at least one of a circular aperture and a plurality of slits.

4. A method as in claim 2 further comprising feeding the tube shoulder/nozzle to be attached to a tube body after the film laminate is sealed into the tube shoulder/nozzle.

5. A method as in claim 1 wherein the cutting of the film laminate to fit into the tube shoulder/nozzle comprises: forming a nozzle opening in the film laminate, and severing the film laminate to fit the shoulder portion of the tube shoulder/nozzle.

6. A method as in claim 5 wherein the nozzle opening is comprised of at least one of a circular aperture and a plurality of slits.

7. A method as in claim 1 further comprising feeding the tube shoulder/nozzle into a detector to determine the positioning of the film laminate sealed into the tube shoulder/nozzle after the film laminate is sealed into the tube shoulder/nozzle.

8. A method as in claim 1 wherein the film laminate has a thickness of about 100 micron to about 400 micron, the barrier layer having a thickness of about 15 micron to about 100 micron and the polymer layer having a thickness of about 75 micron to about 200 micron.

9. A method as in claim 1 wherein the barrier layer of the film laminate is selected from the group consisting of polyethylene terephthalate polymers, polyethylene naphthalate polymers, polytrimethyl naphthalate polymers, ethylene vinyl alcohol copolymers, acrylonitrile methyl-acrylate copolymers, polylactic acid polymers and polyamide polymers.

10. A method as in claim 1 wherein the polymer layer of the film laminate contains a fluorescent material, and the method further comprising contacting the film laminate with a light source to activate the fluorescence to ascertain the position of the film laminate in the tube shoulder/nozzle after the film has been inserted into the tube shoulder/nozzle.

11. A method as in claim 1 wherein the polymer layer is bonded directly to the first portion of the inner surface of the tube shoulder/nozzle at the first end of the tube shoulder/nozzle.

12. A method as in claim 1 wherein an entirety of the first side of the film laminate is bonded directly to the portion of each of the first and second portions of the inner surface of the tube shoulder/nozzle.

13. A method of making a tube shoulder/nozzle with a barrier in the tube shoulder/nozzle comprising:

forming the tube shoulder/nozzle having a shoulder portion and a nozzle portion, the shoulder portion comprising an end of the tube shoulder/nozzle and the tube shoulder/nozzle having an inner surface;

placing the tube shoulder/nozzle in a holder with the end of the tube shoulder/nozzle exposed;

placing a film laminate comprising a barrier layer and a polymer layer above the end of the tube shoulder/nozzle so that the polymer layer faces the tube shoulder/nozzle;

contacting the film laminate with a die/mandrel to simultaneously (i) cut the film laminate to fit into the tube shoulder/nozzle, and (ii) insert the film laminate into the tube shoulder/nozzle, the film laminate conforming to the shape of the shoulder portion of the tube shoulder/nozzle upon being inserted into the tube shoulder/nozzle; and bonding the polymer layer to the inner surface of the tube shoulder/nozzle, the polymer layer bonded directly to the inner surface of the tube shoulder/nozzle at the end of the tube shoulder/nozzle.

14. A method as in claim 13 further comprising attaching the tube shoulder/nozzle to a tube body after the polymer layer of the film laminate is bonded to the inner surface of the tube shoulder/nozzle.

15. A method as in claim 13 wherein the polymer layer forms a first surface of the film laminate, and wherein an entirety of the first surface of the film laminate is bonded directly to the inner surface of the tube shoulder/nozzle.

16. A method of making a tube having a tube shoulder/nozzle and a tube body, the method comprising:

forming the tube shoulder/nozzle comprising a shoulder portion and a nozzle portion, the tube shoulder/nozzle having an end and an inner surface;

placing the tube shoulder/nozzle in a holder with the end of the tube shoulder/nozzle exposed;

placing a film laminate comprising a barrier layer and a polymer layer above the end of the tube shoulder/nozzle so that the polymer layer faces the tube shoulder/nozzle;

contacting the film laminate with a die/mandrel to simultaneously (i) cut the film laminate to fit into the tube shoulder/nozzle, and (ii) insert the film laminate into the tube shoulder/nozzle, the film laminate conforming to the shape of the tube shoulder/nozzle upon being inserted into the tube shoulder/nozzle, the polymer layer bonding to at least a portion of the inner surface of the tube shoulder/nozzle; and attaching the tube shoulder/nozzle to the tube body after the polymer layer of the film laminate is bonded to the portion of the inner surface of the tube shoulder/nozzle.

17. A method as in claim 16 wherein the polymer layer forms a first surface of the film laminate, and wherein an entirety of the first surface of the film laminate is bonded directly to the inner surface of the tube shoulder/nozzle.

* * * * *